United States Patent [19]
Pritchard

[11] Patent Number: 5,547,069
[45] Date of Patent: Aug. 20, 1996

[54] MODULAR CARGO DRIVE UNIT FOR A CONVEYOR

[75] Inventor: Robert J. Pritchard, Lansdale, Pa.

[73] Assignee: Teleflex Incorporated, Plymouth Meeting, Pa.

[21] Appl. No.: 867,502

[22] Filed: Apr. 13, 1992

Related U.S. Application Data

[63] Continuation of Ser. No. 648,028, Jan. 30, 1991, abandoned.

[51] Int. Cl.⁶ ..................................................... B65G 13/12
[52] U.S. Cl. ............................................................. 198/782
[58] Field of Search .................................. 198/780, 782, 198/788; 244/118.1, 137.1

[56] References Cited

U.S. PATENT DOCUMENTS

| | | | |
|---|---|---|---|
| 1,276,222 | 8/1918 | Hugunin | 198/782 |
| 3,613,852 | 10/1971 | Schwarzbeck | 198/782 |
| 3,690,440 | 9/1972 | MacPherson | 198/782 |
| 3,899,070 | 8/1975 | Lang | 198/782 |
| 3,978,975 | 9/1976 | Herbes et al. | 198/782 |
| 4,134,487 | 1/1979 | Veragen | 198/782 |
| 4,589,542 | 5/1986 | Steadman | 198/782 |
| 4,593,810 | 6/1986 | Cook | 198/782 X |
| 4,697,694 | 10/1987 | Huber | 198/782 |

FOREIGN PATENT DOCUMENTS

| | | | |
|---|---|---|---|
| 0391175 | 10/1990 | European Pat. Off. | 198/782 |
| 0602435 | 4/1978 | U.S.S.R. | 198/782 |

*Primary Examiner*—James R. Bidwell
*Attorney, Agent, or Firm*—Howard & Howard

[57] ABSTRACT

A motor driven drive roller (34) frictionally engages the lower surface (32) of a pallet (30) moved along a conveyor path. A drive motor (38) is disposed within the roller (34) and rotates the roller (34) through a multi-stage planetary gear transmission (40) disposed within the roller (34). The roller (34) is moved between a raised operative position and a retracted inoperative position by a lift motor (100) which is independent of the drive motor (38). A steering motor (132), independent of both the drive motor (38) and the lift motor (100), rotates the roller (34) about a vertical steering axis (B) to steer the pallet (30) onto or off the conveyor path. A compression spring is provided between the lift motor (100) and the roller (34) for allowing the roller (34) to move up and down with an irregular lower surface (32) of a pallet (30) to continuously maintain frictional engagement between the roller (34) and the lower surface (32) of the pallet (30). The conveyor is disposed in an aircraft cargo bay for facilitating the loading and unloading of freight.

19 Claims, 9 Drawing Sheets

5,547,069

MODULAR CARGO DRIVE UNIT FOR A CONVEYOR

This application is a continuation of application Ser. No. 648,028, filed Jan. 30, 1991, now abandoned.

TECHNICAL FIELD

The subject invention relates to a power driven conveyor assembly for accommodating freight on a freight carrier, and more particularly to a conveyor section having a live roller with means to adjust the vertical position of the roller relative to the load, and with a motor means for the roller.

BACKGROUND ART

For the accommodation of freight on freight carrying aircraft, a lower deck and sometimes also an upper deck are fitted with a power driven conveyor system for loading freight supported on pallets into and out of the cargo areas. Typically, the conveyor systems include a plurality of longitudinally extending roller trays rotatably supporting free roller conveyor wheels therein. At spaced intervals, power driven rollers are provided for engaging the lower surface of the pallet to move the pallet along the roller trays. These power driven rollers usually allow the roller to be raised and lowered relative to the lower surface of the pallet so that in the event of a power failure, the power driven roller can be recessed to a retracted position and the freight moved manually along the roller trays.

Many such power driven roller assemblies are supported in a canister type housing and are mounted so that the roller is partially submerged below the surface of the floor. This is done so that the roller may be constructed of a sufficiently large diameter while not extending above the typically lower profile roller trays. In order to maintain a sufficient frictional contact with the lower surface of the pallet, the rollers are frequently pneumatic so that the resilient roller wheel itself will deflect upon encountering irregularities in the lower surface of the pallet, while continuing to maintain a sufficient frictional engagement with the lower surface of the pallet to drive the pallet along the roller trays. Examples of prior art devices constructed in this manner include the U.S. Pat. No. 3,899,070 to Lang, issued Aug. 12, 1975, U.S. Pat. No. 3,565,233 to Hinman, issued Feb. 23, 1971, U.S. Pat. No. 3,978,975 to Herbes et al, issued Sep. 7, 1976 and U.S. Pat. No. 4,589,542 to Steadman, issued May 20, 1986.

The prior art pneumatic roller which flexes with the regularities in the lower surface of the pallet are deficient in that severe irregularities may either over burden the roller and cause a rupture or may diminish frictional contact to a point where slippage occurs between the roller and the lower surface of the pallet. Also, as the roller flexes with the irregularities in the lower surface of the pallet, the distance between the rolling axis of the roller and the point of engagement of the lower surface of the pallet varies such that the linear velocity imparted to the pallet varies. As a result, the pallet is not smoothly conveyed over the roller trays.

SUMMARY OF THE INVENTION AND ADVANTAGES

An aircraft conveyor drive roller assembly of the type for rollably engaging the lower surface of a pallet and urging the pallet along a conveyor path according to the subject invention comprises a roller supported for rotation about a substantially horizontal drive axis for frictionally engaging the lower surface of the pallet, support means for supporting the roller above an upper surface of an aircraft floor structure with at least a portion of the roller submergible below the upper surface of floor structure, and a drive motor operatively coupled to the roller for forcibly urging the roller to rotate about the drive axis. The invention is characterized by a pallet tracking means for automatically moving the drive axis of the roller vertically in response to irregularities in the lower surface of the pallet while the drive motor forcibly urges the roller to rotate about the drive axis to continually maintain frictional engagement between the roller and the lower surface of the pallet.

The pallet tracking means of the subject invention overcomes the disadvantages of the prior art by moving the drive axis, and hence the entire roller, in response to irregularities encountered in the lower surface of the pallet. Therefore, a constant frictional engagement is maintained between the roller and the lower surface of the pallet. Further, the distance between the lower surface of the pallet and the drive axis is maintained so that the tangential velocity imparted to the pallet by the roller is maintained at a steady rate, thereby smoothly conveying the pallet along the conveyor path at all times regardless of any irregularities in the lower surface of the pallet.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
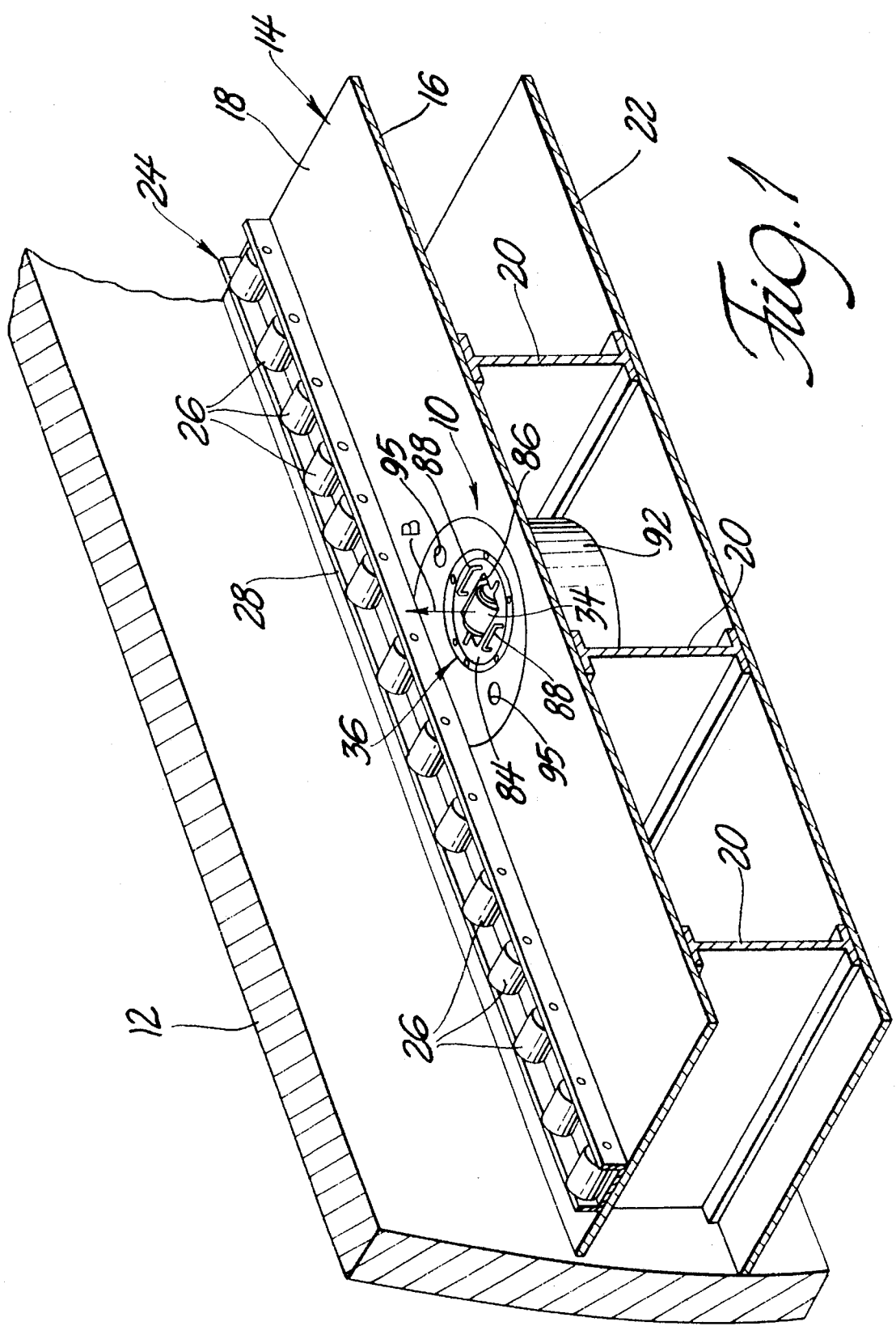
FIG. 1 is a fragmentary perspective view of the subject assembly disposed for operation in an aircraft.

Referring to the Figures, wherein like numerals indicate like or corresponding parts throughout the several views, an aircraft conveyor drive roller assembly is generally shown at 10. In FIG. 1, a simplified perspective view of the subject assembly 10 is shown disposed for operation in an aircraft. A fragmented perspective view of an aircraft fuselage 12 is shown including a floor structure, generally indicated at 14, extending horitonzally from the fuselage 12. The floor structure 14 includes a sheet-like top layer 16 having an upper surface 18. A plurality of laterally extending I-beams 20 support the top layer 16 from below. A sheet-like bottom layer 22 is disposed below the I-beams 20.

The subject assembly 10 functions in cooperation with a plurality of load supporting conveyor trays, generally indicated at 24. As shown in FIG. 1, the conveyor trays 24 include a plurality of spaced conveyor wheels 26 supported for free rotation in a U-shaped channel 28. A pallet 30, shown in phantom in FIG. 4, includes a lower surface 32 which is supported on the conveyor wheels 26. The assembly 10 is disposed to rollably engage the lower surface 32 of the pallet 30 and urge the pallet 30 along the conveyor trays 24 to establish a conveyor path. Usually, at least two spaced parallel tracks of conveyor trays 24 are employed to support the pallet 30, with the drive roller assemblies 10 disposed in regularly spaced intervals between the two tracks of conveyor trays 24.

Figure 3:
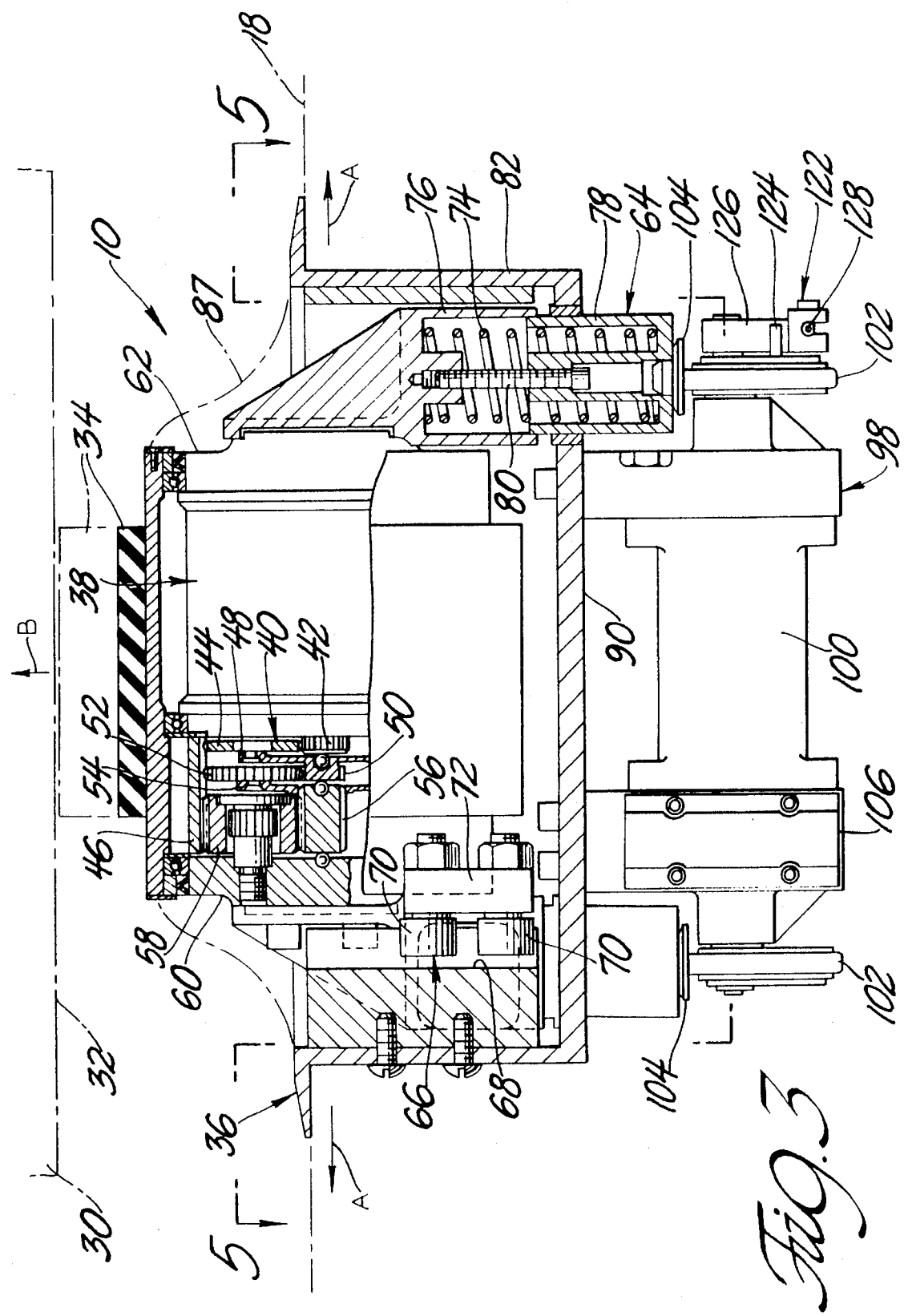
FIG. 3 is a cross-sectional view of the subject assembly as taken along lines 3—3 in FIG. 2.
Figure 4:
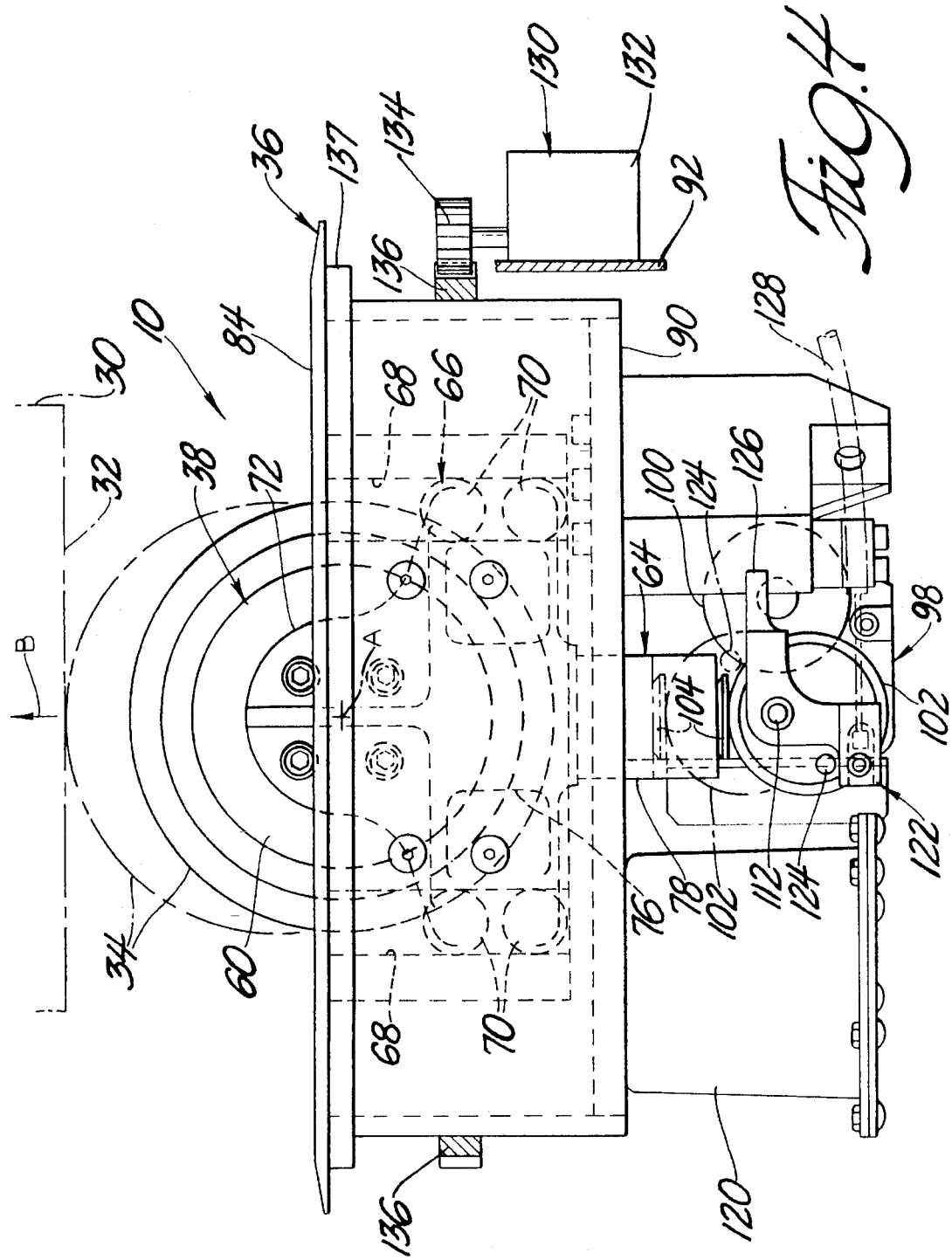
FIG. 4 is a side elevational view of the subject assembly.

The subject assembly 10 includes a cylindrical roller 34 fabricated from a hard rubber material. The roller 34 is approximately 4 to 5 inches wide and approximately 5 inches in outside diameter. The roller 34 is supported for rotation about a substantially horizontal drive axis A, as shown in FIGS. 3 and 4, for frictionally engaging the lower surface 32 of the pallet 30. As perhaps best shown in FIGS. 3, 4 and 8, a support means, generally indicated at 36, is provided for supporting the roller 34 above the upper surface 18 of the aircraft floor structure 14, with at least a portion of the roller 34 submergible below the upper surface 18 of the floor structure 14. The roller 34 is disposed partially below the upper surface 18 of the top layer 16 and partially above the upper surface 18 of the top layer 16. As will be described in greater detail subsequentially, the support means 36 connects the assembly 10 to the top layer 16 of the floor structure 14, between adjacent pairs of I-beams 20.

Referring to FIG. 3, an electric drive motor, generally indicated at 38, is operatively coupled to the roller 34 for forcibly urging the roller 34 to rotate about the drive axis A. The drive motor 38 includes a multi-stage planetary gear transmission, generally indicated at 40, for transferring rotary motion from the drive motor 38 to the roller 34. The transmission 40 is centered on the drive axis A.

The transmission 40 includes a drive pinion 42 extending integrally from the shaft of the drive motor 38 and centrally along the drive axis A. The drive pinion 42 meshes with a first planet gear 44. A ring gear 46 is disposed annularly about the drive axis A and is fixedly connected to the roller 34. The drive ring 46 meshes with the first planet gear 44 thereby causing the first planet gear 44 to orbit around the drive axis A in response to rotation of the drive pinion 42. A first planet carrier 48 rotatably supports the first planet gear 44 and includes an integral first sun gear 50 disposed along the drive axis A. A second planet gear 52 operatively meshes with the first sun gear 50 and the ring gear 46 to orbit about the drive axis A, non-synchroniously with the first planet gear 44. Similarly, a second planet carrier 54 rotatably supports the second planet gear 52 and is integrally connected to a second sun gear 56. The second sun gear 56 meshes with a third planet gear 58. The rotary axis of the third planet gear 58 is fixed to a left inner housing member 60 and also fixed relative to the drive axis A and the drive motor 38. The third planet gear 58 meshes with the ring gear 46 and thereby causes rotation of the ring gear 46 about the drive axis A. As the ring gear 46 and the roller 34 are fixed to one another, the roller 34 is simultaneously rotated with the ring gear 46 about the drive axis A. A substantial gear reduction is accomplished by the transmission 40; preferably about 289:1 between the drive pinion 42 and the roller 34.

The drive motor 38 is fixedly supported on a right inner housing 62 relative to the drive axis A. As best shown in FIG. 3, the left 60 and right 62 inner housings, and therefore the drive motor 38 and the transmission 40 are disposed substantially within the cylindrical enclosure defined by the roller 34. Therefore, valuable space is conserved by utilizing the interior area of the roller 34.

A pallet tracking means, generally indicated at 64 in FIG. 3, is provided for automatically moving the drive axis A of the roller 34 vertically, i.e., up or down, in response to irregularities in the lower surface 32 of the pallet 30 while the drive motor 38 forcibly urges the roller 34 to continue rotating about the drive axis A to maintain frictional engagement between the roller 34 and the lower surface 32 of the pallet 30. That is, the pallet tracking means 64 permits the entire roller 34, along with the drive motor 38 and the transmission 40 to be moved vertically, either up or down, when the lower surface 32 of a pallet 30 exhibits an uneven contour. This permits an optimal frictional engagement to be maintained between the driving surface of the roller 34 and the pallet 30.

The pallet tracking means 64 is distinguished from the prior art attempts to maintain frictional contact wherein a pneumatic roller deforms in response to irregularities in the lower surface of the pallet while maintaining its drive axis in the same position. Instead, the subject invention moves the drive axis A upon encountering irregularities and the hard rubber roller 34 deforms very little. In other words, in order to track the lower surface 32 of the pallet 30, the pallet tracking means 64 moves the entire drive axis A when a bump or dip in the lower surface 32 of the pallet 30 converges upon the roller 34. And, as a result of eliminating the additional space which pneumatic rollers require, the subject invention utilizes the interior space of the roller 34 to house the drive motor 38 and the transmission 40.

Figure 2:
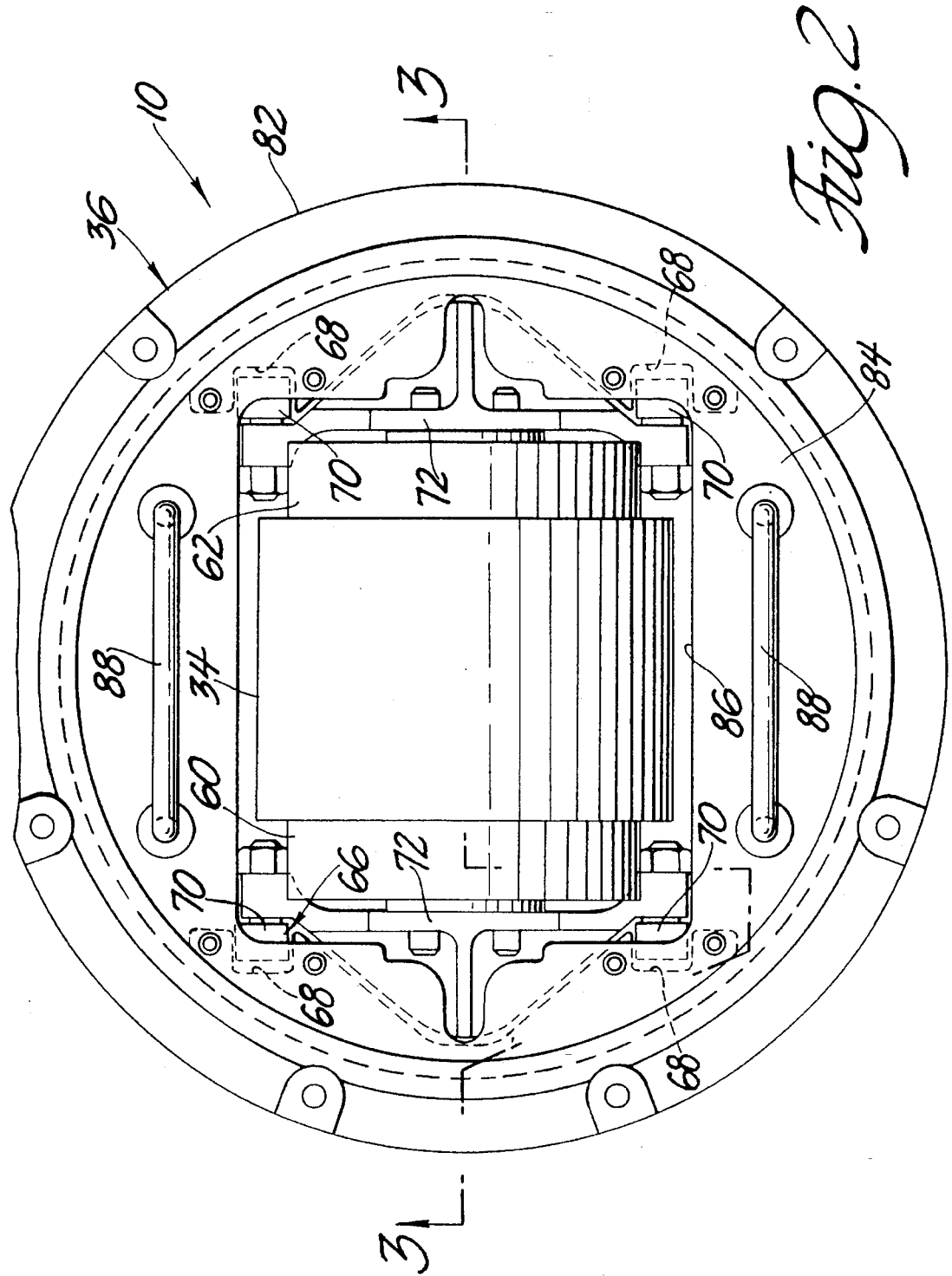
FIG. 2 is a top view of the subject assembly.

As shown in FIGS. 2, 3 and 4, the pallet tracking means 64 includes a translation means, generally indicated at 66, for maintaining the drive axis A parallel to its original horizontal orientation during vertical movement thereof. In other words, the translation means 66 continuously supports the drive axis A in a horizontal position, i.e., parallel to the upper surface 18 of the floor structure 14, so that the roller 34 maintains the maximum possible surface area contact with the pallet 30. Therefore, the translation means 66 restricts movement of the drive axis A to purely translational motion, where any point along the drive axis A will at any given time have the same velocity and direction of motion.

The translation means 66 includes a plurality of linear, vertically extending, guide slots 68 disposed in the support means 36. As shown in FIG. 2, four such guide slots 68 are provided. Also, the translation means 66 includes a plurality of guide members 70 slideably and rotatably disposed in the guide slots 68. The guide members 70 are rotatably supported on a guide plate 72 which, in turn, is fixed to the left 60 and right 62 inner housing. Therefore, the rotatable guide members 70 are positionally fixed relative to the drive axis A of the roller 34. As best shown in FIGS. 3 and 4, two vertically aligned guide members 70 are disposed in each guide slot 68.

Referring again to FIG. 3, the pallet tracking means 64 includes a biasing means 74 for resiliently returning the drive axis A of the roller 34 toward an extended operative position. The roller 34 is shown in the extended operative position in phantom in FIGS. 3 and 4. The biasing means 74 comprises a pair of compression springs supported on the left 60 and right 62 inner housings, respectively. Each compression spring is disposed between an upper cup 76 formed integral with the guide plate 72 and fixed to the respective left 60 or right 62 inner housing, and a lower cup 78 telescopically disposed in the upper cup 76. A stop screw 80 is threadably received in the upper cap 76 and slideably disposed centrally through the lower cup 76 for preventing separation of the upper 76 and lower 78 cups and allowing adjustment of the extended operative position, as shown in FIG. 3. Therefore, as the roller 34 encounters irregularities in the lower surface 32 of the pallet 30, the biasing means 74, acting through the upper cup 76, urges the drive axis A upwardly, or allows the drive axis A to move downwardly, so that frictional engagement between the roller 34 and the pallet 30 may be continuously maintained.

Figure 8:
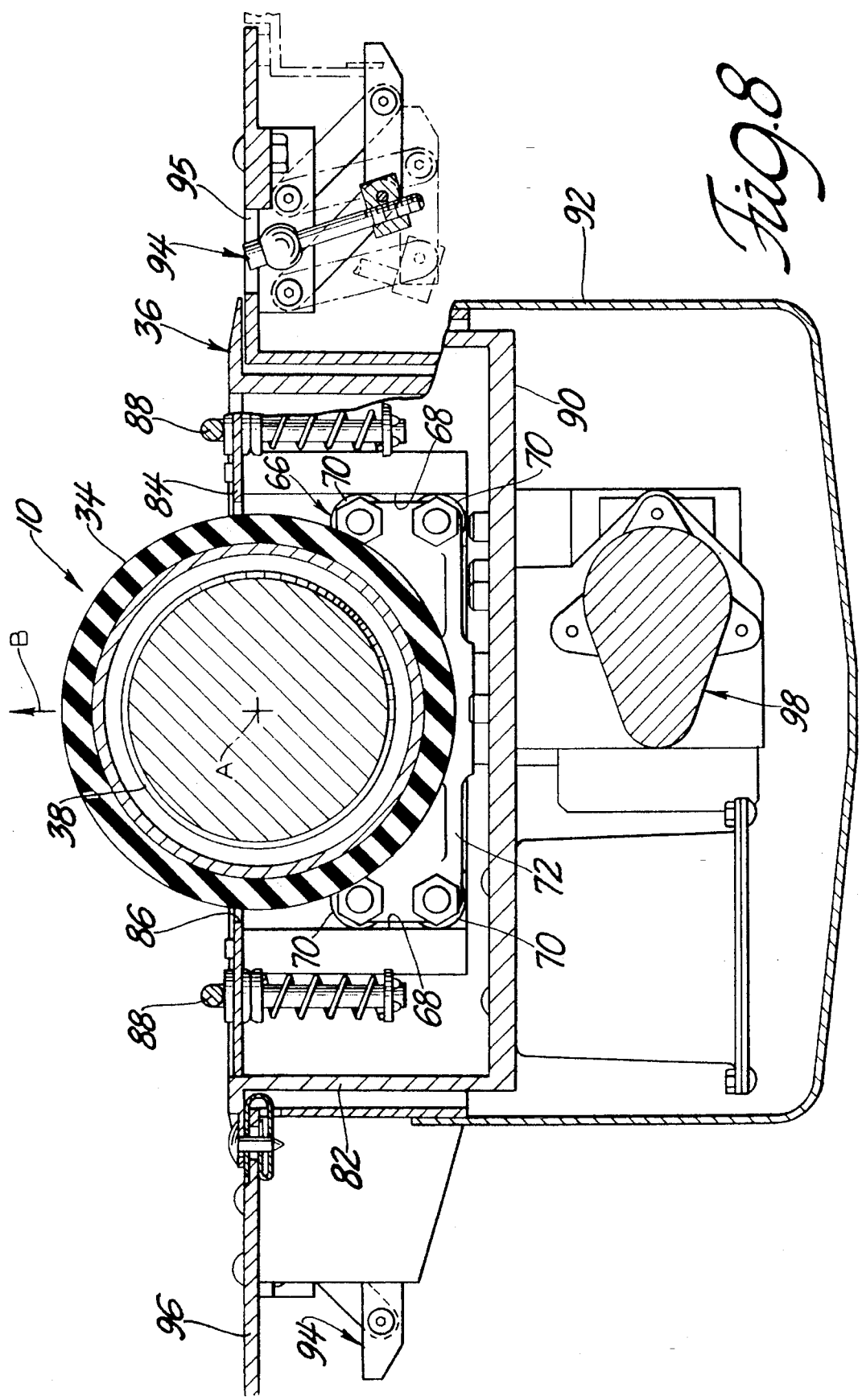
FIG. 8 is a cross-sectional view of the subject assembly as taken along lines 8—8 of FIG. 7.

The support means 36 is perhaps best shown in FIGS. 3, 4 and 8, including a cylindrical outer housing 82. The outer housing 82 includes a sheet-like cover 84 having a rectangular opening 86 therein for the roller 34. A flexible protective shield 87 may be employed to protect from harmful foreign substances, as shown in phantom in FIG. 3. A pair of self-retracting handles 88 extend through the cover 84 for facilitating removal and servicing of the assembly 10. The outer housing 82 further includes a circular bottom 90, through which the lower cup 78 of the biasing means 74 is slideably disposed in a bushing, as shown in FIG. 3.

Figure 7:
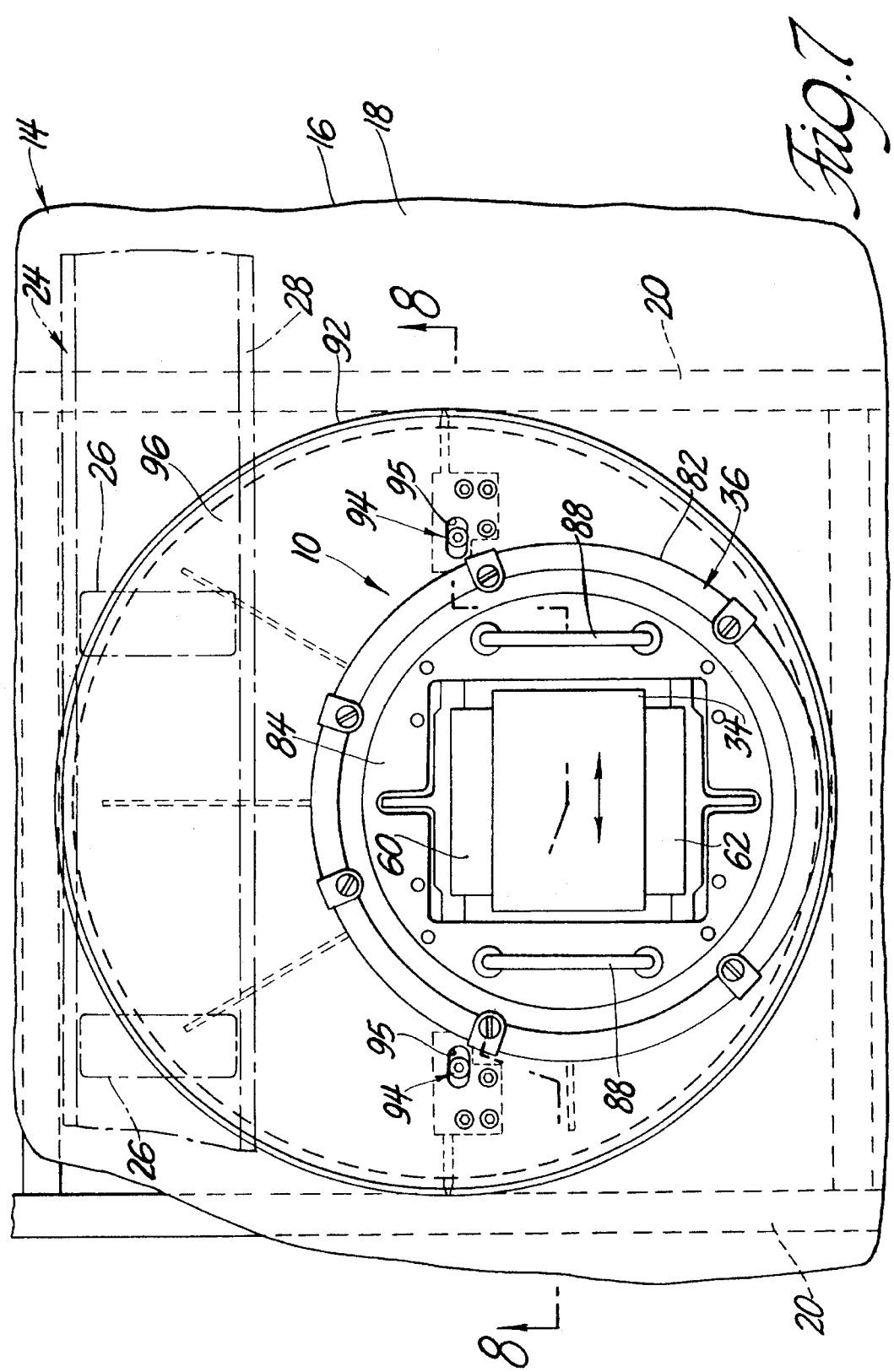
FIG. 7 is a top view of the subject assembly disposed for operation in an aircraft flow structure.

Referring to FIGS. 1, 7 and 8, the outer housing 82 is disposed within a canister 92 which forms a receptacle for the assembly 10 when disposed in the floor structure 14. In FIGS. 7 and 8, a screw operated attachment assembly, generally indicated at 94, is provided for securing the canister 92 to the floor structure 14. The attachment assembly 94 includes a pair of four bar linkages, and more particularly two parallel-bar linkages, disposed below the top layer 16 of the floor structure 14 for attaching to the floor structure 14, below the top layer 16, to engage downwardly extending support brackets (shown in phantom) adjacent the I-beams 20. Access to the actuator screws is provided by oval openings 95, shown in FIG. 7.

In FIGS. 1 and 7, the canister 92 is shown disposed eccentrically with respect to the outer housing 82. That is, the circular canister 92 is offset from the center of the outer housing 82, when viewed from the top. For this reason, an appropriately shaped adapter ring 96 is provided for interconnecting the outer housing 82 to the canister 92. The adapter ring 96 is required because the canister 92 shown in the Figures is sized for accepting a larger prior art drive roller assembly. However, the subject assembly 10 is more compactly and efficiently designed, although having the same power output, and consequently a much smaller area is required to house it. Therefore, the retrofit assembly 10 requires the adapter ring 96 for installation in a prior art canister 92.

The smaller subject assembly 10 is particularly advantageous when, as shown in FIGS. 1 and 7, the conveyor trays 24 are fastened to the floor structure 14 so that they overlap the edge of the canister 92. This overlapping by the conveyor trays 24 is a common practice in many aircraft. Accordingly, the prior art assemblies require removal of the conveyor trays 24 prior to servicing or replacement of the power drive roller assembly. However, the subject invention eliminates this requirement due to its smaller size. Therefore, as is evident from FIGS. 1 and 7, the subject assembly 10 may be removed for servicing without first removing the conveyor trays 24.

A lift means, generally indicated at 98 in FIGS. 3–6, is provided for vertically moving the roller 34, the drive axis A and the pallet tracking means 64 between the raised operative position and a retracted inoperative position. That is, the lift means 98 allows the roller 34 to be lowered below the roller surface of the conveyor trays 24 so that the pallet 30 can be manually moved along the conveyor trays 24, i.e., without the aid of the assembly 10. This is particularly important in the event of a power failure, where the dynamic braking action of the rollers 34 would otherwise need to be overcome if the rollers 34 were to remain in the raised operative position. The roller 34 and the drive axis A are shown in the retracted inoperative position in FIGS. 3 and 4, and in the raised operative position in phantom in FIGS. 3 and 4.

The lift means 98, more particularly, includes an electric lift motor 100 which is spaced from and operated completely independent of the drive motor 38. The lift motor 100 is fixedly suspended from the bottom 90 of the outer housing 82 and includes a drive shaft extending outwardly from both ends thereof. The drive shaft of the lift motor 100 is maintained parallel to the drive axis A. A rotary lift cam 102 is disposed at each end of the lift motor 100 in operative engagement with the drive shaft for vertically displacing the pallet tracking means 64 upon rotation of the lift cams 102. The lift cams 102 have an essentially circular outer periphery defined by a roller bearing to diminish friction. Each lower cup 78 of the biasing means 74 functions as a popper type lifter for the two cams 102, respectively, and accordingly each includes a cam engaging plate 104. Rotation of the lift cams 102 causes a simultaneous vertical displacement in the lower cups 78, thereby imparting vertical movement to the drive axis A of the roller 34 by a way of the biasing means 74, the upper cup 76 and the guide plates 72.

Figure 5:
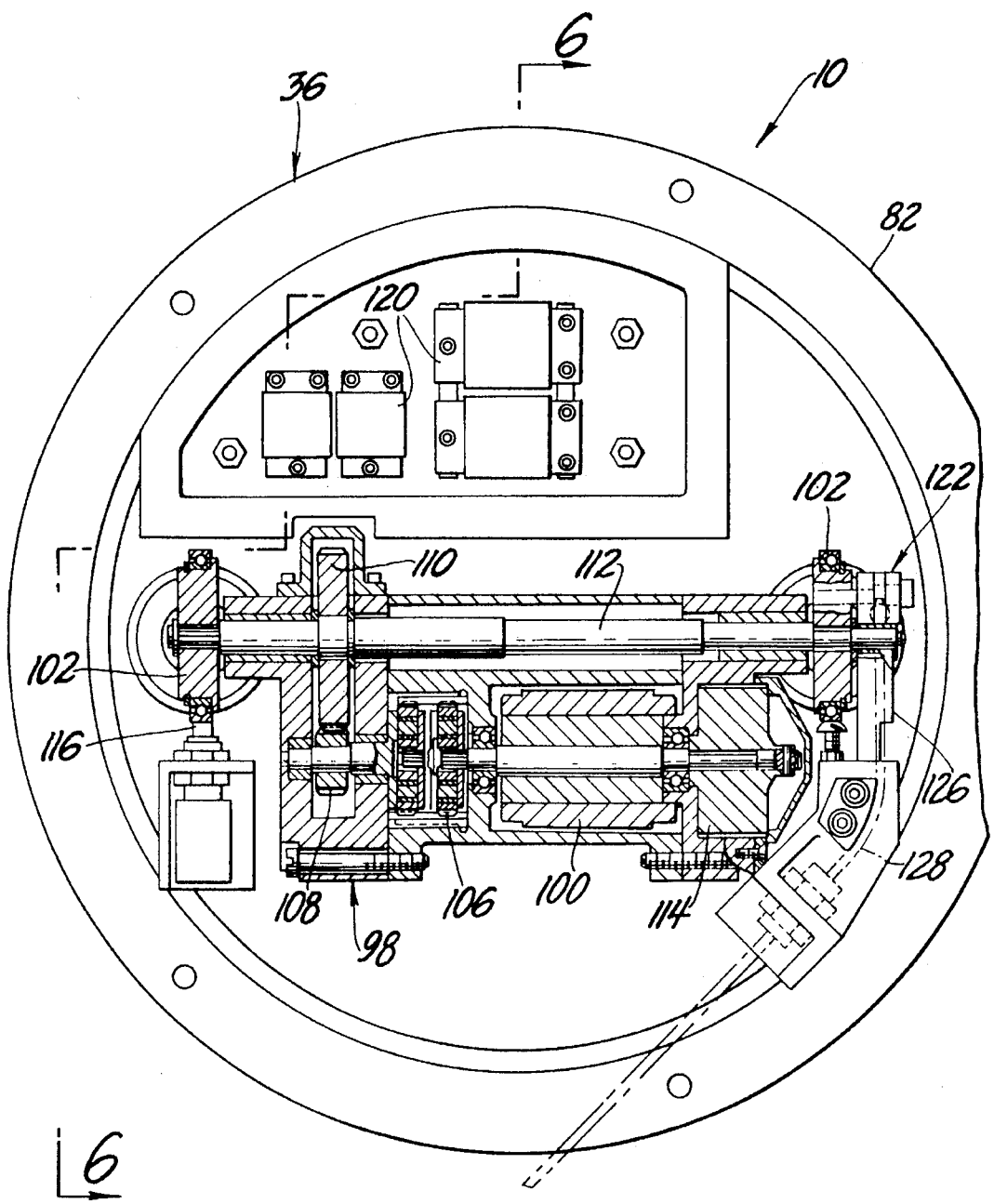
FIG. 5 is a cross-sectional view of the subject assembly as taken along lines 5—5 of FIG. 3.

The lift means 98 is shown in FIG. 5 including a two stage planetary gear set transmission 106 which drives first and second spur gears 108, 110. The first gear 108 is integrally rotated with the final planet carrier in the transmission 106 and the second gear 110 is fixed upon an output shaft 112. The lift cams 102 are eccentrically disposed upon opposite ends of the output shaft 112. A brake 114 is provided on the lift motor 110 drive shaft.

Figure 6:
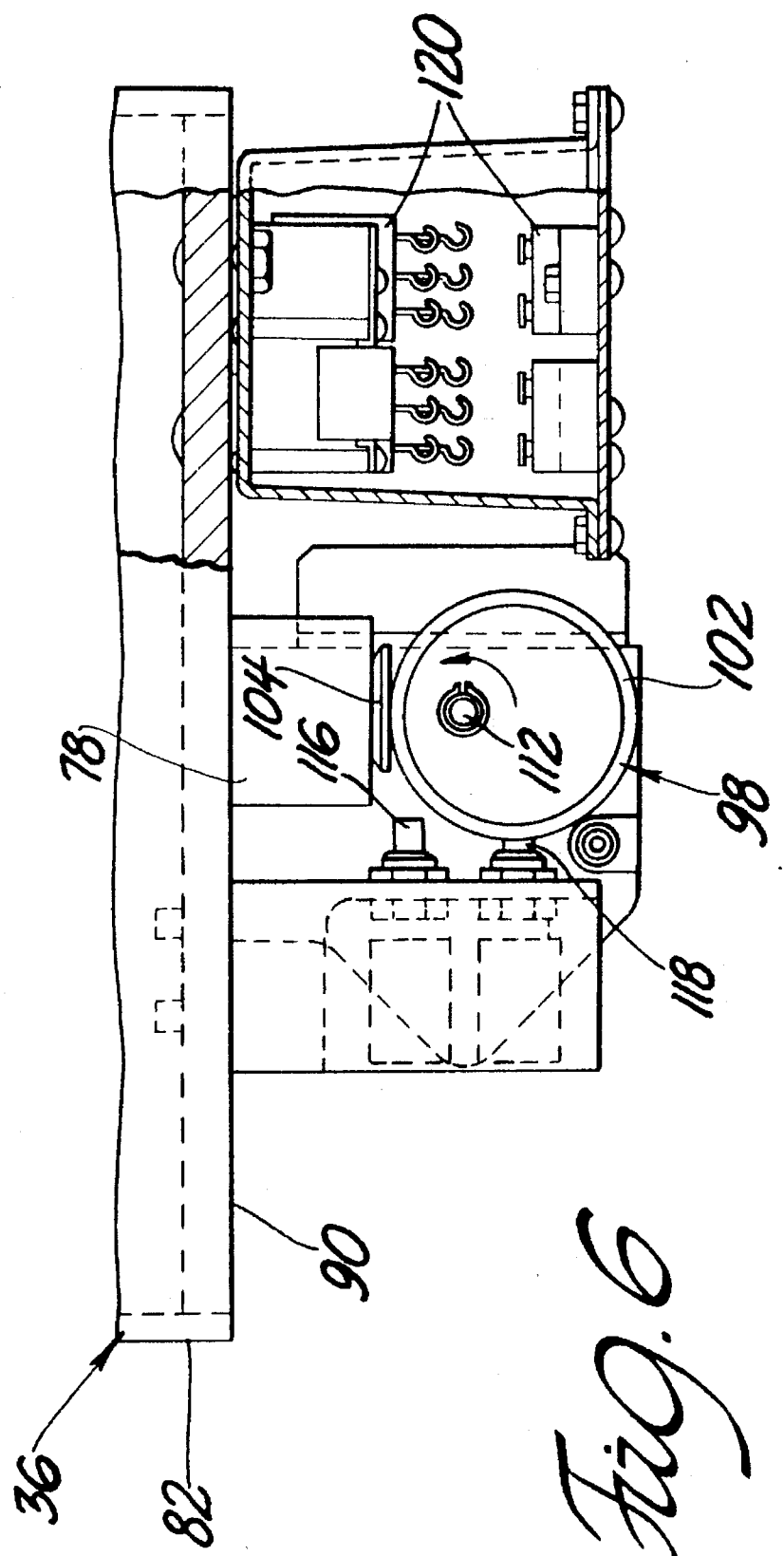
FIG. 6 is a fragmentary cross-sectional view of the subject assembly as taken along lines 6—6 of FIG. 5.

Referring to FIGS. 5 and 6, one of the lift cams 102 is shown disposed for alternately engaging a pair of electrical switches comprising a raised switch 116 and a lowered switch 118. In FIG. 6, the lift cam 102 is shown depressing the lowered switch 118 indicating that the assembly 10 is in the retracted inoperative position. When the lift motor 100 is activated to raise the roller 34 to the raised operative position, the lift cam 102 is rotated until it contacts and depresses the raised switch 116, thereby braking the electrical circuit to the lift motor and causing the roller 34 to remain in the raised position. Also in FIG. 6, various typical electrical components are generally indicated at 120, such as relays and the like, and are suspended from the bottom 90 of the outer housing On rare occasions, a power failure in the aircraft, or defective component in the electrical system, will render the drive motor 38 inoperative with the roller 34 stranded in the raised operative position. Under such circumstances, the roller 34 must be retracted so that a pallet 30 can be manually moved over the conveyor trays 24. Referring again to FIGS. 3–5, the lift means 98 includes a safety release means, generally indicated at 122, operatively engageable with one of the lift cams 102 for manually lowering the pallet tracking means 64 to the retracted inoperative position. More particularly, the safety release means 122 includes a pin 124 extending axially from the lift cam 102. The pin 124 is offset from the axis of the output shaft 112 such that a force applied to the pin 124 rotates the lift cam 102. The safety release means 122 further includes a bell crank 126 pivotally supported about the output shaft 112, but not moveable with the output shaft 112. A motion transmitting remote control assembly 128 is shown in phantom in FIGS. 4 and 5 operatively connected to the bell crank 126 for transmitting motion to the bell crank 126 along a flexible motion transmitting path. As will be appreciated, the remote control assembly 128 preferably comprises a core element supported for movement in a conduit.

A tensile force applied to the core element of the remote control assembly 128 will rotate the bell crank 126 in a counter clockwise direction about the axis of the output shaft 112. When the lift cam 102 is in the raised operative position, with the pin 124 positioned as shown in phantom in FIG. 4, counter clockwise movement of the bell crank 126 will engage and forcibly rotate the pin 124, and hence the lift cam 102, in a counter clockwise direction about the axis of the output shaft 112. Thus, both lift cams 102 are forced over center of the output shaft 112 to allow the weight of the roller 34 and drive motor 34 to lower themselves to the retracted inoperative position. In this manner, the pallet tracking means 64, and more importantly the roller 34, can be manually lowered to the retracted inoperative position in the event of a power failure.

As shown in FIG. 4, the assembly 10 may also include a steering means, generally indicated at 130, for rotating the roller 34 and the drive axis A about a substantially vertical steering axis B. The steering axis B extends centrally through the cylindrical area defined by the outer housing 82, and perpendicularly intersects the drive axis A. More particularly, the steering means 130 includes an electric steering motor 132 spaced from and completely independent of the drive motor 38 and the lift motor 100. Because the steering means 130 is independent, it can be included or excluded from the assembly 10 at the discretion of the user. Also, the independent steering means 130 moves the assembly 10 about the steering axis B irrespective of whether the roller 34 is in the raised operative or lowered inoperative positions.

The steering motor 132 includes a rotatable pinion gear 134 supported for rotation on the drive shaft of the steering motor 132. The steering motor 132 and the pinion gear 134 are supported by the canister 92. An externally toothed annular gear 136 is fixedly disposed on the exterior surface of the outer housing 82. The annular gear 136 is disposed concentrically about the steering axis B and in a plane extending parallel to the drive axis A. The pinion gear 134 and annular gear 136 are disposed in operative meshing engagement so that as the steering motor 132 is actuated, the annular gear 136, the outer housing 82, and the roller 34 are rotated about the steering axis B. Bearings 137 are provided between the outer housing 82 and the canister 92 to establish free rotation therebetween.

Figure 9:
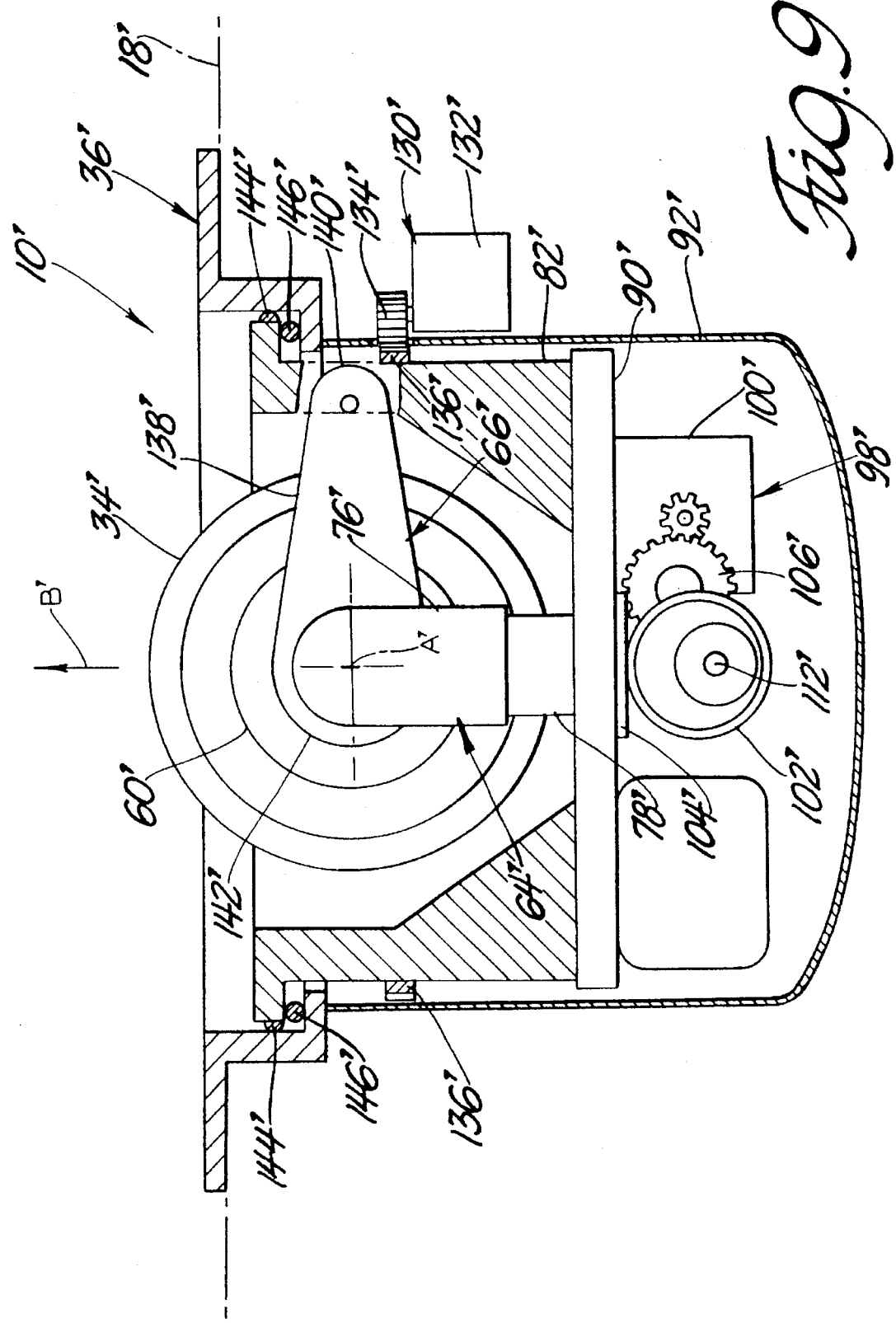
FIG. 9 is a simplified cross-sectional view of an alternative embodiment of the subject assembly.

In FIG. 9, a simplified cross-sectional view of an alternative embodiment of the subject invention is generally shown at 10'. The assembly 10' is substantially identical to that described above, however the translation means 66' includes a load bearing swing arm 138' pivotally secured at one end 140' to the outer housing 82', and pivotally secured at the other end 142' relative to the drive axis A'. More specifically, the end 142' is pivotally secured to the inner housing 60' about the drive axis A. The pallet tracking means 64', therefore, acts between the lift cam 102' and the swing arm 138' to permit tracking of the pallet. The assembly 10' is shown disposed within a canister 92' including radial 144' and thrust 146' bearings therebetween.

In operation, the lift motor 100 is actuated to raise the roller 34 to the raised operative position, as shown in phantom in FIGS. 3 and 4. When the lift cam 102 engages the raised switch 116, the lift motor 100 is deenergized and the roller 34 remains in the raised operative position. The drive motor 38 is then energized and rotates the roller 34 through the transmission 40. The rotating roller 34 engages and urges the pallet 30 to move along the conveyor trays 24. As the uneven lower surface 32 of the pallet 30 moves across the roller 34, the biasing means 74 allows the entire roller 34 and its drive axis A to track vertically, up and down, with the lower surface 32 of the pallet 30 to maintain a continuous frictional engagement between the roller 34 and the pallet 30.

If it is desired to turn the roller 34 about the steering axis B, the steering motor 132 is energized and causes the outer housing 182 to rotate about the steering axis B by way of the meshing pinion gear 134 and annular gear 136. In the event of a power failure with the roller 34 stranded in the raised operative position, the roller 34 can be moved to a lowered inoperative position by manually actuating the remote control assembly 128 and causing the bell crank 126 to throw the pin 124 over center, thereby rotating the lift cam 102 to the lowered inoperative position shown in FIG. 4. In this manner, the pallet 30 can be manually moved across the conveyor trays 24 without interference of the assembly 10.

The subject assembly 10 is particularly advantageous in that the drive motor 38, the lift motor 100 and the steering motor 130 are separate, independent units. Therefore, the modular assembly 10 can be installed to user satisfaction including or excluding the lift means 98 and the steering means 130. Also, the pallet tracking means 64 allows the roller 34 to drive the conveyor 30 at a constant tangential velocity because the drive axis A is maintained at a uniform distance from the lower surface 32 of the pallet 30, even over peaks and valleys in the lower surface 32. Further, the assembly 10 is compact and can be retrofit in prior art canisters 92 with sufficient additional space between the adjacent conveyor trays 24 to allow removal and servicing of the assembly 10 without removal of the conveyor trays 24. Additionally, the subject assembly 10 is lighter than the prior art and therefore more economical to operate in aircraft.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An aircraft conveyor drive assembly (10, 10') of the type for rollably engaging the lower surface (32) of a pallet (30) and urging the pallet (30) along a conveyor path, said assembly (10) comprising: a roller (34) supported for rotation about a substantially horizontal drive axis (A) for frictionally engaging the lower surface (32) of the pallet (30); support means (36) for supporting said roller (34) above an upper surface (18) of an aircraft floor structure (14) with at least a portion of said roller (34) submergible below the upper surface (18) of the floor structure (14); a drive motor (38) operatively coupled to said roller (34) for forcibly urging said roller (34) to rotate about said drive axis (A); and characterized by pallet tracking means (64) for automatically moving said drive axis (A) of said roller (34) vertically in response to irregularities in the lower surface

(32) of the pallet (30) while said drive motor (38) simultaneously rotates said roller (34) about said drive axis (A) to continuously maintain frictional engagement between said roller (34) and the lower surface (32) of the pallet (30) during uninterrupted rotation of said roller (34); said pallet tracking means (64) including biasing means (74) for continuously urging said drive axis (A) of said roller (34) toward an extended operative position.

2. An assembly (10, 10') as set forth in claim 1 further characterized by said pallet tracking means (64) including translation means (66) for maintaining said drive axis (A) parallel to said substantially horizontal orientation during vertical movement thereof.

3. An assembly (10, 10') as set forth in claim 2 further characterized by said biasing means (74) comprising a compression spring.

4. An assembly (10) as set forth in claim 2 further characterized by said translation means (66) including a plurality of guide slots (68) and a guide member (70) slideably disposed in each of said guide slots (68).

5. An assembly (10) as set forth in claim 4 further characterized by said guide slots (68) being linearly vertically disposed in said support means (36) and said guide members (70) being positionally fixed relative to said drive axis (A) of said roller (34).

6. An assembly (10) as set forth in claim 5 further characterized by each of said guide members (70) being independently rotatable.

7. An assembly (10') as set forth in claim 2 further characterized by said translation means (66') including a swing arm (138') pivotally secured at one end (140') to said support means (36') and pivotally secured at another end (142') relative to said drive axis (A').

8. An assembly (10, 10') as set forth in either of claims 4 or 7 further characterized by lift means (98) for vertically moving said roller (34), said drive axis (A) and said pallet tracking means (64) between said raised operative position and a retracted inoperative position.

9. An assembly (10, 10') as set forth in claim 8 further characterized by said lift means including a lift motor (100) spaced from and independent of said drive motor (38).

10. An assembly (10, 10') as set forth in claim 9 further characterized by said lift means (98) including a rotary lift cam (102) operatively connected to said lift motor (100) for vertically displacing said pallet tracking means (64).

11. An assembly (10, 10') as set forth in claim 10 further characterized by said lift means (98) including safety release means (122) operatively coupled to said lift cam (102) for manually lowering said pallet tracking means (64) to said retracted inoperative position.

12. An assembly (10, 10') as set forth in claim 11 further characterized by said safety release means (122) including a pin (124) extending axially from said lift cam (102), a bell crank (126) operatively engageable with said pin (124) and a remote control assembly (128) for transmitting motion to said bell crank (126) along a flexible motion transmitting path.

13. An assembly (10, 10') as set forth in claim 11 further characterized by said drive motor (38) being disposed substantially within a cylindrical enclosure defined by said roller (34).

14. An assembly (10, 10') as set forth in claim 13 further characterized by said drive motor (38) including a multistage planetary gear transmission (40) for transferring motion from said drive motor (38) to said roller (34).

15. An assembly (10, 10') as set forth in claim 14 further characterized by steering means (130) for rotating said roller (34) and said drive axis (A) about a substantially vertical steering axis (B).

16. An assembly (10, 10') as set forth in claim 15 further characterized by said steering means (130) including a steering motor (132) spaced from said drive motor (38) and said lift motor (100).

17. An assembly (10, 10') as set forth in claim 16 further characterized by said steering means (130) including an annular gear (136) fixed relative to said drive axis (A) disposed in a plane extending parallel to said drive axis (A) and concentrically about said steering axis (B).

18. An assembly (10, 10') as set forth in claim 17 further characterized by said steering motor (132) including a rotatable pinion gear (134) operatively meshing with said annular gear (136) for rotating said annular gear (136) about said steering axis (B).

19. An aircraft conveyor drive roller assembly (10, 10') for rollably engaging the lower surface (32) of a pallet (30) and urging the pallet along a conveyor path, said assembly (10, 10') comprising: a roller (34) supported for rotation about a substantially horizontal drive axis (A) for frictionally engaging the lower surface (32) of the pallet (30); support means (36) for supporting said roller (34) above an upper surface (18) of an aircraft floor structure (14) with at least a portion of said roller (34) disposed below the upper surface (18) of the floor structure (14); a drive motor disposed substantially within a cylindrical enclosure defined by said roller (34) and operatively coupled to said roller (34) for forcibly urging said roller (34) to rotate about said drive axis (A); biasing means (74) for allowing vertical movement of said drive axis (A) while continuously urging said drive axis (A) toward a raised operative position; and a lift motor (100) spaced from and independent of said drive motor (38) for vertically moving said biasing means (74), said drive axis (A), and said roller (34) between said raised operative position and a retracted inoperative position.

* * * * *

(12) EX PARTE REEXAMINATION CERTIFICATE (5022nd)
United States Patent
Pritchard

(10) Number: US 5,547,069 C1
(45) Certificate Issued: Nov. 23, 2004

(54) MODULAR CARGO DRIVE UNIT FOR A CONVEYOR

(75) Inventor: Robert J. Pritchard, Lansdale, PA (US)

(73) Assignee: Technology Holding Company II, Wilmington, DE (US)

Reexamination Request:
No. 90/006,321, Jul. 3, 2002

Reexamination Certificate for:
Patent No.: 5,547,069
Issued: Apr. 20, 1996
Appl. No.: 07/867,502
Filed: Apr. 13, 1992

Related U.S. Application Data

(63) Continuation of application No. 07/648,028, filed on Jan. 30, 1991, now abandoned.

(51) Int. Cl.$^7$ ............................................... B65G 13/12
(52) U.S. Cl. ...................................................... 198/782
(58) Field of Search ............................... 198/780, 782, 198/788; 244/118.1, 137.1

(56) References Cited

U.S. PATENT DOCUMENTS

| | | |
|---|---|---|
| 1,276,222 A | 8/1918 | Hugunin |
| 3,279,585 A | 10/1966 | Shen |
| 3,447,665 A | 6/1969 | Egeland et al. |
| 3,565,233 A | 2/1971 | Hinman |
| 3,613,852 A | 10/1971 | Schwarzbeck |
| 3,631,964 A | 1/1972 | Hinman et al. |
| 3,690,440 A | 9/1972 | MacPherson |
| 3,698,539 A | 10/1972 | Schwarzbeck |
| 3,737,022 A | 6/1973 | DeNeefe et al. |
| 3,888,342 A | 6/1975 | Geller |
| 3,899,070 A | 8/1975 | Lang |
| 3,978,975 A | 9/1976 | Herbes et al. |
| 4,134,487 A | 1/1979 | Veragen |
| 4,589,542 A | 5/1986 | Steadman |
| 4,593,810 A | 6/1986 | Cook |
| 4,697,694 A | 10/1987 | Huber |

FOREIGN PATENT DOCUMENTS

| | | |
|---|---|---|
| EP | 0391175 | 10/1990 |
| SU | 0602435 | 4/1978 |

OTHER PUBLICATIONS

Lucas Aerospace Product Data Sheet, Self–Lifting Power Drive Unit, Model No. 181RA23R163 (2 sheets coded AN–000319 & '320).

Lucas Aerospace Product Data Sheet, Fixed–Lift Powered Drive Unit, Model No. 181RA57R164 (2 sheets coded AN–000321 & '322).

Vickers–Eaton Product Data Sheets, Model 6315 Electric Powered Roller Assembly.

Undated photograph depicting powered drive roller installed in a DC–10 aircraft, which photograph was publicly available from McDonnell–Douglas prior to Jan. 30, 1991.

Teleflex Incorporated's Proposed Claim Construction dated Oct. 4, 2001.

(List continued on next page.)

*Primary Examiner*—Joseph E Valenza

(57) ABSTRACT

A motor driven drive roller (34) frictionally engages the lower surface (32) of a pallet (30) moved along a conveyor path. A drive motor (38) is disposed within the roller (34) and rotates the roller (34) through a multi-stage planetary gear transmission (40) disposed within the roller (34). The roller (34) is moved between a raised operative position and a retracted inoperative position by a lift motor (100) which is independent of the drive motor (38). A steering motor (132), independent of both the drive motor (38) and the lift motor (100), rotates the roller (34) about a vertical steering axis (B) to steer the pallet (30) onto or off the conveyor path. A compression spring is provided between the lift motor (100) and the roller (34) for allowing the roller (34) to move up and down with an irregular lower surface (32) of a pallet (30) to continuously maintain frictional engagement between the roller (34) and the lower surface (32) of the pallet (30). The conveyor is disposed in an aircraft cargo bay for facilitating the loading and unloading of freight.

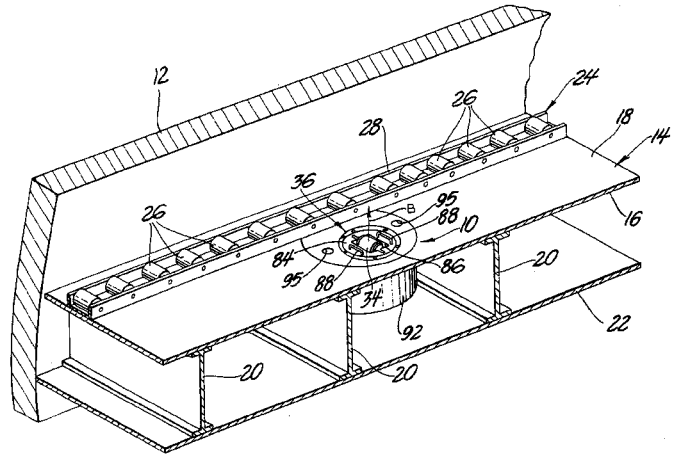

OTHER PUBLICATIONS

Joint Claim Construction Statement dated Oct. 12, 2001 with Ex. A—Patent 5,547,069, Ex. B—Teleflex v Ancra CV 01–2937L6B, Ex. C—Teleflex v Ancra CV 01–2937L6M, Ex. D—Board of Appeals Appeal # 95–2426, Ex. E—Lucas Western Inc.—brochure "Cargo Power Drive Units" (5 pages).

Notice of Lodging Recent Decisions Currently Only Available in Electronic Format in Support of Plaintiff Teleflex's Opening Claim Construction Brief (Decision copies omitted) dated Oct. 19, 2001.

Plaintiff Teleflex's Opening Claim Construction Brief (Amended) dated Oct. 19, 2001.

Declaration of Peter Anderson in Support of Plaintiff Teleflex's Opening Claim Construction Brief dated Oct. 19, 2001.

Declaration of Todd Fitzsimmons in Support of Plaintiff Teleflex's Opening Claim Construction Brief (Exs. C, D & E omitted) dated Oct. 19, 2001.

Defendant Aero Union Corporation's Claim Construction Brief dated Oct. 24, 2001.

Notice of Lodging in Support of Aero Union Corporation's Response to Plaintiff Teleflex's Opening Claim Construction Brief (Decision copy omitted) dated Oct. 24, 2001.

Declaration of Radhika Tandon in Support of Aero Union Corporation's Response to Plaintiff Teleflex's Opening Claim Construction Brief dated Oct. 24, 2001.

Plaintiff Teleflex's Response Brief on Claim Construction dated Nov. 2, 2001.

Notice of Lodging Recent Decisions Currently Only Available in Electronic Format in Support of Plaintiff Teleflex's Response Claim Construction Brief (Decision copy omitted) dated Nov. 2, 2001.

Defendant Aero Union Corporation's Notice of Motion and Motion for Summary Judgment of Invalidity Pursuant to 35 USC §§ 102 and 103 dated Apr. 15, 2002.

Declaration of Steven A. Velinsky, Ph.D., P.E. in Support of Aero Union Corporation's Motion for Summary Judgment of Invalidity Pursuant to 35 USC §§ 102 and 103 dated Apr. 13, 2002.

Declaration of David Crivelli in Support of Aero Union's Motion for Summary Judgment of Invalidity Pursuant to 35 USC §§ 102 and 103 dated Apr. 13, 2002.

Declaration of Lisa Kobialka in Support of Aero Union's Motion for Summary Judgment of Invalidity Pursuant to 35 USC §§ 102 and 103 dated Apr. 14, 2002.

Statement of Uncontroverted Facts and Conclusions of Law in Support of Defendant Aero Union Corporation's Motion for Summary Judgment of Invalidity Pursuant to 35 USC §§ 102 and 103 dated Apr. 14, 2002.

Teleflex's Opposition to Aero Union's Motion for Summary Judgment of Invalidity Pursuant to USC §§ 102 and 103 dated Apr. 22, 2002.

Declaration of Chris Stratford in Support of Plaintiff Teleflex's Opposition to Aero Union's Motion for Summary Judgment Motion of Invalidity dated Apr. 22, 2002.

Plaintiff Teleflex's Response to Aero Union's Statement of Uncontroverted Facts and Conclusions of Law dated Apr. 22, 2002.

Aero Union Corporation's Reply to Teleflex's Opposition to Aero Union's Motion for Summary Judgment of Invalidity dated Apr. 27, 2002.

Supplemental Declaration of Lisa Kobialka in Support of Aero Union Corporation's Reply to Teleflex's Opposition to Aero Union's Motion for Summary Judgment of Invalidity dated Apr. 26, 2002.

Supplemental Declaration of David Crivelli in Support of Aero Union Corporation's Reply to Teleflex's Opposition to Aero Union's Motion for Summary Judgment of Invalidity dated Apr. 26, 2002.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–19 is confirmed.

* * * * *